J. TEMPLE.

WATER WHEEL.

No. 1,405. Reissued Feb. 10, 1863.

Witnesses;
Geo. H. Knights
J. G. S. Effusion

Inventor;
John Temple

THE NORRIS PETERS CO., PHOTO-LITHO., WASHINGTON, D. C.

UNITED STATES PATENT OFFICE.

TEMPLE, MILLS, AND STOUT, OF MIDDLETOWN, OHIO, ASSIGNEES OF JOHN TEMPLE.

IMPROVEMENT IN WATER-WHEELS.

Specification forming part of Letters Patent No. 22,901, dated February 8, 1859; Reissue No. 1,405, dated February 10, 1863.

*To all whom it may concern:*

Be it known that JOHN TEMPLE, of Middletown, in the county of Butler and State of Ohio, invented new and useful Improvements in Sluices for Water-Wheels; and the following is a full and exact description of the same, reference being had to the accompanying drawings, making a part of this specification.

The improvements of the said JOHN TEMPLE relate to what are technically known as "scroll-sluices;" and it consists, first, in the construction and manner of applying scroll-sluice gates so that the feed-passages are easily and quickly contracted or expanded when submerged with the water-wheel under any degree of hydrostatic pressure, and the feed-passages are increased or diminished in capacity by the adjustment of the gates as the labors or power of the wheel may require. The construction is such that at all times when in use, whether the gates are open to a greater or less degree, they afford a regularly graduated scroll-shute, and whether a larger or smaller amount of water is admitted to the wheel, they hold the water uniformly in its action upon the full face of the buckets of the wheel.

Said invention further consists in the construction and arrangement of guards for the adjustable gates, whereby the latter are relieved from hydrostatic pressure, to which they would otherwise be subject in their submerged condition, thus allowing the gates to be easily opened and closed to any desired extent while directing the water upon the buckets; and said improvements further consist in the use of a series of levers and a ring arranged centrally above the sluice chest and operated by suitable mechanism for simultaneously and uniformly opening and closing a series of sluice-gates, and in combination with said gate operating and connecting mechanism the adjustable scroll-sluice chute herein fully described.

The accompanying drawings above referred to illustrate said invention of JOHN TEMPLE.

Figure 1:
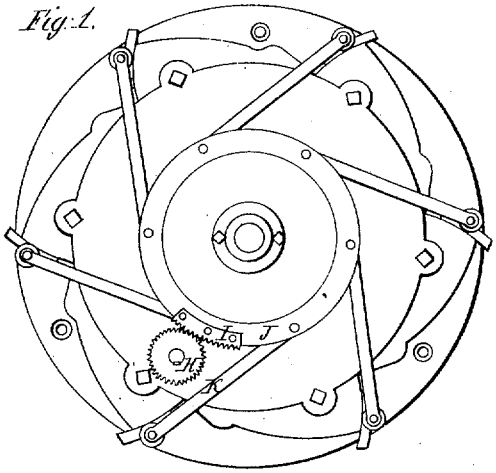
Figure 3:
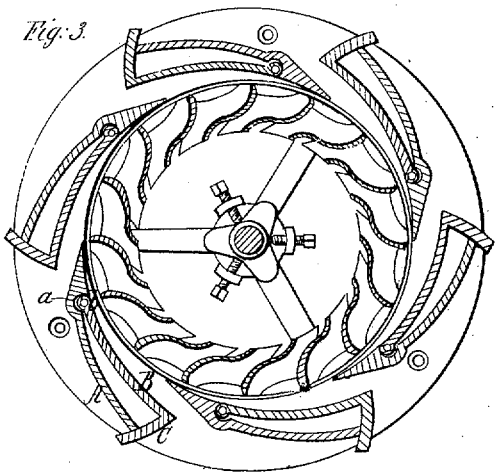
Figure 2:
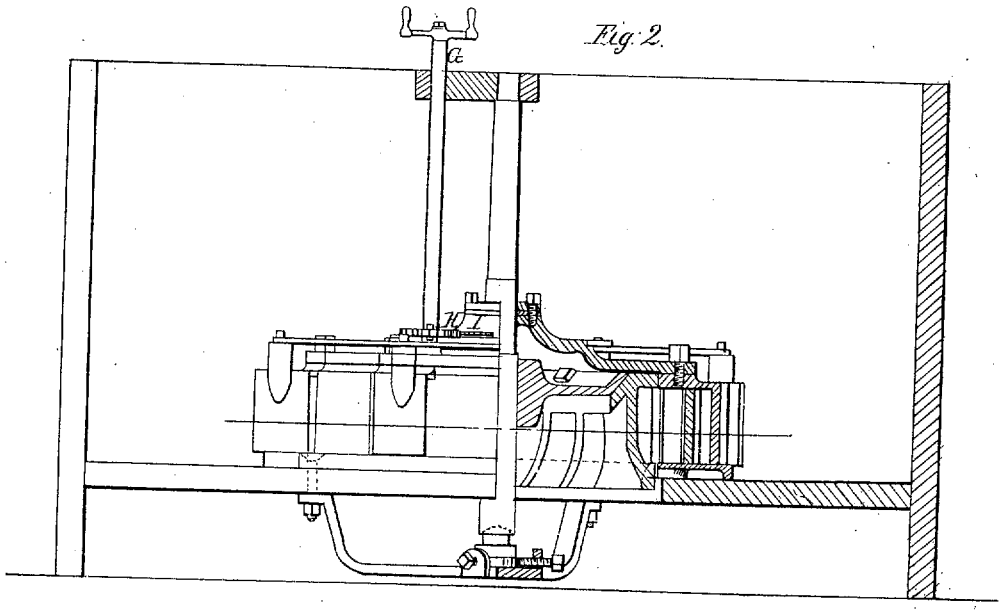

Figure 1 is a top view of the sluice-chest with the levers and ring connecting the gates with their actuating mechanism. Fig. 2 is a sectional side elevation with the shaft and gearing by which the gates are operated. Fig. 3 is a horizontal section of the scroll-sluice gates and their guards surrounding the annular space to be occupied by the water-wheel.

The curb of the sluice-chest is composed of a series of equidistant scroll-guards, A, each having a gate, B C, the wing B of which is curved, as represented in the drawings, to correspond with the concavity of the guard A. The wing B, which constitutes the adjustable scroll-chute, is constructed with a cylindrical bead, *b*, at its forward end, which fits into a suitable socket, *a*, in the guard, so as to form a hinge.

C is a segmental reverted lip forming an arc concentric with the cylindrical hinge *a b*, serving when the gate is open or closed, or partially open, to prevent the flow of water behind it, and thus keep it in equilibrio.

G is a winch, the rotation of which imparts motion to the gates, to open or close them to any extent by means of suitable transmitting mechanism, H I J K. The joints between the curb and the wing, or scroll-chute B are sufficiently open to permit the slow passage of water incident to the motion of opening and closing the gates; but these joints are too small to permit an entering current that would substantially influence their action.

It will be seen that whether the gates are open or partially closed the wings B afford a regularly-graduated scroll-chute, which, whether a small or large amount of water is admitted, directs it uniformly to its work upon the full face of the wheel. It will also be observed that in every position of the gates the whole force of the current is transmitted directly to the wheel, the knuckles or hinge of the gates being substantially free in their capability of adjustment, undue friction and resistance being avoided by the equal hydrostatic pressure upon the seat of the hinge.

It is deemed proper here to remark that in the foregoing specification reference is made to the scroll-sluice chute or wing B and its reverted lip C as constituting the gate.

In operation the chest of sluices and gates is submerged with a scroll bucket wheel beneath any head or hydrostatic pressure, and the water is admitted to any desired extent through the adjustable gates, the entering current being directed by the rear portion of the outer face of the guard toward the hinge *a b* and slightly tangential to the wheel, when it is gradually deflected or inclined inwardly by the curve of the chute or wing B, so as to cause its most forcible current to strike with its full force against the face of the buckets nearest to the periphery of the wheel, each bucket of the wheel being constantly subjected to the entire hydrostatic pressure of the head beneath which the wheel is submerged.

Having thus fully described this invention and its mode of operation, what is claimed, and desired to be secured by Letters Patent as the invention of said JOHN TEMPLE, is—

1. The construction and use of the scroll-sluice gate B C, applied to operate with a water-wheel, in the manner substantially as described.

2. In combination with the hinged sluice-gate B C, the guard A, as and for the purpose described.

3. The levers K and ring J, centrally arranged above the sluice chest for simultaneously operating a series of gates in combination with the gates, and actuated by mechanism substantially as described.

JOHN TEMPLE.
WM. M. MILLS,
ATLAS L. STOUT.

Witnesses:
A. J. PECK,
H. P. K. PECK.